(12) United States Patent
Glenn

(10) Patent No.: US 7,039,937 B1
(45) Date of Patent: May 2, 2006

(54) SYSTEM AND METHOD FOR PROVIDING SATELLITE SIGNALS TO MULTIPLE RECEIVING UNITS

(76) Inventor: R. Bryce Glenn, 950 Cross Creek Dr., Roselle, IL (US) 60172

( * ) Notice: Subject to any disclaimer, the term of this patent is extended or adjusted under 35 U.S.C. 154(b) by 942 days.

(21) Appl. No.: 09/795,673

(22) Filed: Feb. 28, 2001

(51) Int. Cl.
   *H04N 7/20* (2006.01)
(52) U.S. Cl. .......................... 725/68; 725/67; 725/63; 725/71
(58) Field of Classification Search .................. 725/63, 725/67, 68, 69, 70, 71, 73
   See application file for complete search history.

(56) References Cited

U.S. PATENT DOCUMENTS

| | | | |
|---|---|---|---|
| 6,211,844 B1 * | 4/2001 | Davi et al. .................. | 343/876 |
| 6,757,519 B1 * | 6/2004 | Peyrovian ................... | 455/11.1 |
| 2002/0178454 A1 * | 11/2002 | Antoine et al. ............. | 725/106 |

* cited by examiner

Primary Examiner—Ngoc Vu
(74) Attorney, Agent, or Firm—Law Office of Marc D. Machtinger, Ltd.

(57) ABSTRACT

A system and method for providing signals from a plurality of satellites to a plurality of receiving units is disclosed. The system and method of the present invention make efficient use of multi-switches to enable multiple receiving units to seamlessly alternate between channels of various satellite signals, and optionally between satellite signals and terrestrial antenna signals. In basic form, first and second receptors, such as DISH satellite LNBs, are connected to input ports of primary Digital Broadcast System multi-switches having multiple input ports and output ports. The output ports of the first such primary multi-switch are conductively connected to first input ports of at least two secondary multi-switches, and the output ports of the second such primary multi-switch are conductively connected to second input ports of the same secondary multi-switches. The outputs of the secondary multi-switches are provided to receiving units. The multi-switches are matched such that poling and circuitry components are compatible and enable the seamless alternation between channels originating from different signals.

4 Claims, 12 Drawing Sheets

SYSTEM AND METHOD FOR PROVIDING SATELLITE SIGNALS TO MULTIPLE RECEIVING UNITS

TECHNICAL FIELD

The present invention relates to a system and method for providing satellite signals to multiple receiving units, and more specifically to a system and method for efficiently utilizing multi-switches to provide signals from a plurality of satellites to a plurality of receiving units such that transitions are transparent to viewers.

BACKGROUND OF THE INVENTION

Traditionally, satellites for transmitting numerous television channels are stationed in orbit, generally over the equator, and remain substantially stationary with respect to the Earth. Signals from any single satellite may contain many channels, however, a signal from any one satellite will not contain all available broadcasts. Commonly, signals from as many as three or four satellites may be desirable to serve a single viewer or a single building complex.

Satellite signals are typically collected using a Digital Sky Highway antenna, or DISH antenna, aligned with the target satellite. DISH antennae are generally shaped parabolically to focus the signal at a focal point. A Low Noise Block (LNB) receptor is placed at the focal point of the DISH antenna to receive the radio wave signals and transform them into high frequency electrical signals. The signals are divided into two components; a horizontal component and a vertical component.

Various system configurations for transmitting signals from multiple satellites to multiple receiving units exist. Furthermore, local channels are often desired, and thus such systems include means for transmitting signals from a terrestrial antenna to the same receiving units. At high frequencies, signal splitters are undesirable due to substantial power loss. Therefore, many of these configurations require multiple DISH antennae, or other costly equipment.

The most basic system configuration for transmitting signals from a single satellite and a single terrestrial antenna to a single receiving unit is shown in Prior Art FIG. 5. The system 10 includes a DISH antenna 15 having an LNB 20, and signal lines 25 connecting the LNB 20 to an AB switch 30. The AB switch 30 is typically a slide switch which must be manually operated. A terrestrial antenna 35 also provides a signal via signal line 40 to AB switch 30. The AB switch outputs a combined signal via line 45 which is decombined by decombiner 50, and received by receiving unit 55. This configuration is limited to providing signals to a single receiving unit, and must be manually switched between the satellite signal and the local signal.

This basic system is modified in Prior Art FIG. 6 to allow a single receiving unit to receive signals from two satellites and local channels. A second DISH antenna 16 having LNB 17 is added to the system. The three signals are fed into an ABC switch 32, which is typically a three-position slide switch. This system allows a single receiving unit to receive signals from two different satellites and local channels, however, the viewer still must manually switch between the two satellite signals and local channels.

System configurations for providing signals to multiple receiving units typically employ Digital Broadcast System (DBS) multi-switches having multiple input ports and either a single output port, or multiple output ports. DBS multi-switches are powered switches which have a poling cycle at which signals are sampled from different inputs. Caution must be taken to match the poling and circuitry characteristics of the multi-switches with the components of the system to produce desired results.

The Prior Art system shown in FIG. 7 illustrates the transmission of two satellite signals to two different receiving units without the need for a manual switching device. A signal component from each DISH antenna is fed into an input of each multi-switch 60 and 65. Both signal components are required in order to receive a usable signal, however, the signal from one signal component line is sent back up the same line and down the other line, enabled by power from the receiver. Thus, each multi-switch receives both signal components from both satellites. Adding further receiving units with such a system would require additional satellite DISH antennae.

Prior Art FIG. 8 illustrates a system configuration which enables signals from two satellites to be received by up to four receiving units using only two DISH antennae, and without the need for manual switching. This system makes use of dual LNB receptors 70 and 75. Satellite DISH antennae utilizing dual LNBs receive signals from two different satellites, and focus them to two dual LNB components respectively. Thus, each dual LNB has 4 signal component lines extending therefrom.

Prior Art FIG. 9 illustrates a system configuration in which signals from three satellites are transmitted to up to four receiving units. The system uses three DISH antennae and a powered multi-switch 80 receiving power from an external power supply 85. Adding more receiving units to this system requires further DISH antennae or other costly equipment.

Finally, Prior Art FIG. 10 illustrates a system configuration in which signals from up to four satellites and one terrestrial antenna are fed into a multi-switch having nine input ports and eight output ports. Up to eight receiving units will receive signals from all sources, however, adding additional receiving units requires additional DISH antenna, and such large multi-switch units are costly.

Solutions for serving multiple receiving units have focused around additional DISH antennae and expensive multi-switches having multiple ports which require complicated circuitry. The greater the demands on the system, the more costly and complicated it becomes. Therefore, an efficient system and method for transmitting multiple signals to multiple receiving units in which the switching is transparent to the viewer would be desirable.

SUMMARY OF THE INVENTION

In view of the insufficiencies discussed above, it is an object of the present invention to provide an efficient system and method for transmitting multiple satellite signals, and optionally a terrestrial antenna signal, to multiple receiving units in such a manner that switching between signals is transparent to the viewer.

It is another objective of the present invention to provide a system and method for transmitting multiple satellite signals to multiple receiving units which reduces the need for duplicative DISH antennae.

It is a further object of the present invention to provide a system and method for transmitting multiple satellite signals to multiple receiving units which reduces the need for expensive equipment such as DBS multi-switches having numerous input and output ports.

It is yet another object of the present invention to provide a system and method for transmitting multiple satellite signals to multiple receiving units in which two satellite signals and optionally one terrestrial antenna signal are seamlessly transmitted to up to four receiving units using only two DISH antennae and minimizing the size and expense of required multi-switches.

It is yet a further object of the present invention to provide a system and method for transmitting multiple satellite signals to multiple receiving units in which two satellite signals and optionally one terrestrial antenna signal are seamlessly transmitted to up to eight receiving units using two primary multi-switches with two, or optionally three, input ports and eight output ports.

It is still another object of the present invention to provide a system and method for transmitting multiple satellite signals to multiple receiving units in which signals from three satellites and optionally one terrestrial antenna are seamlessly transmitted to up to eight receiving units using two DISH antennae and two primary multi-switches with two, or optionally three, input ports and eight output ports.

It is still a further object of the present invention to provide a system and method for transmitting multiple satellite signals to multiple receiving units in which signals from three satellites and optionally one terrestrial antenna are seamlessly transmitted to up to a variable number of receiving units in which two of the three satellite signals are transmitted to each receiving unit, using three DISH antennae and three primary multi-switches with two, or optionally three, input ports and eight output ports.

It is additionally an object of the present invention to provide a system and method for transmitting multiple satellite signals to multiple receiving units in which one regular DISH antenna and one twin LNB are used, and two multi-switches are used.

It is finally another object of the present invention to provide a system and method for transmitting multiple satellite signals to multiple receiving units in which outputs from a primary set of multi-switches are fed into inputs of a secondary set of multi-switches such that the poling and circuitry characteristics of the secondary and primary multi-switches are compatible to allow seamless switching.

In view of the above objects, the system and method of the present invention, in basic form, includes at least two receptors for receiving signals from at least two satellites. The signals are divided into two components, usually a horizontal component and a vertical component. The components of one of the signals are fed into the input ports of a first primary DBS multi-switch, and the components of the other signal are fed into the input ports of a second primary DBS multi-switch. Optionally, a terrestrial antenna signal is also fed into another input port of each of the primary multi-switches. These primary multi-switches are preferably provided with power via external power supplies. The outputs of the primary multi-switches are each fed to a secondary multi-switch such as a switch having two input ports and one output port each.

DBS multi-switches are designated by the number of input ports and output ports present by following the letters "SW" with a first digit representing the number of input ports, and a second digit representing the number of output ports. For example, an SW21 has two input ports and one output port. An SW34 has three input ports and four output ports.

Thus, the primary multi-switches described above may be SW24 or SW34 switches, and the secondary switches may be SW21 switches. Each secondary multi-switch receives one output from each of the primary multi-switches. The output of each secondary switch is fed to a receiver, the line optionally having a decombiner prior to the receiver if a terrestrial antenna signal is included in order to separate the terrestrial signal from the satellite signals.

The result of the configuration of the present invention is that the switching between satellite signals, and between satellite signals and terrestrial signal is transparent to the viewer, allowing for seamless transitions.

Heretofore, it has not been known that the poling and circuitry characteristics of various DBS multi-switches would be compatible in such a way that they could be combined in the manner disclosed by the present invention. However, if DBS switches are selected in such a manner that such compatibility is achieved, such a system allows for an efficient and cost effective solution for providing multiple satellite signals to multiple receiving units.

Other embodiments consistent with the principles of the present invention include but are not limited to the following: First, the use of SW28 or SW38 switches as primary switches and SW21 switches as secondary switches allows signals from two satellites and optionally one terrestrial antenna to be seamlessly distributed to up to eight receiving units. Second, the use of a twin LNB along with a regular LNB in conjunction with SW28 or SW38 primary switches and SW21 secondary switches allows signals from three different satellites and optionally one terrestrial antenna signal to be seamlessly distributed to up to eight receiving units. Furthermore, the use of three LNBs, three SW28 or SW38 primary switches, and SW21 secondary switches allows for three satellite signals and optionally one terrestrial signal to be distributed in combinations of two satellite signals and optionally one terrestrial signal to a variable number of receiving units depending on desired configuration. Finally, one embodiment of the present invention involves one twin LNB and one regular LNB being fed directly to two SW21 switches to allow seamless distribution of three satellite signals to two receiving units.

It is contemplated that the principles of the present invention can be extended to numerous configurations and variations in order to create various solutions.

Other features and advantages of the invention will be apparent from the following detailed description taken in conjunction with the following drawings.

DETAILED DESCRIPTION OF THE PREFERRED EMBODIMENT

Figure 1A:
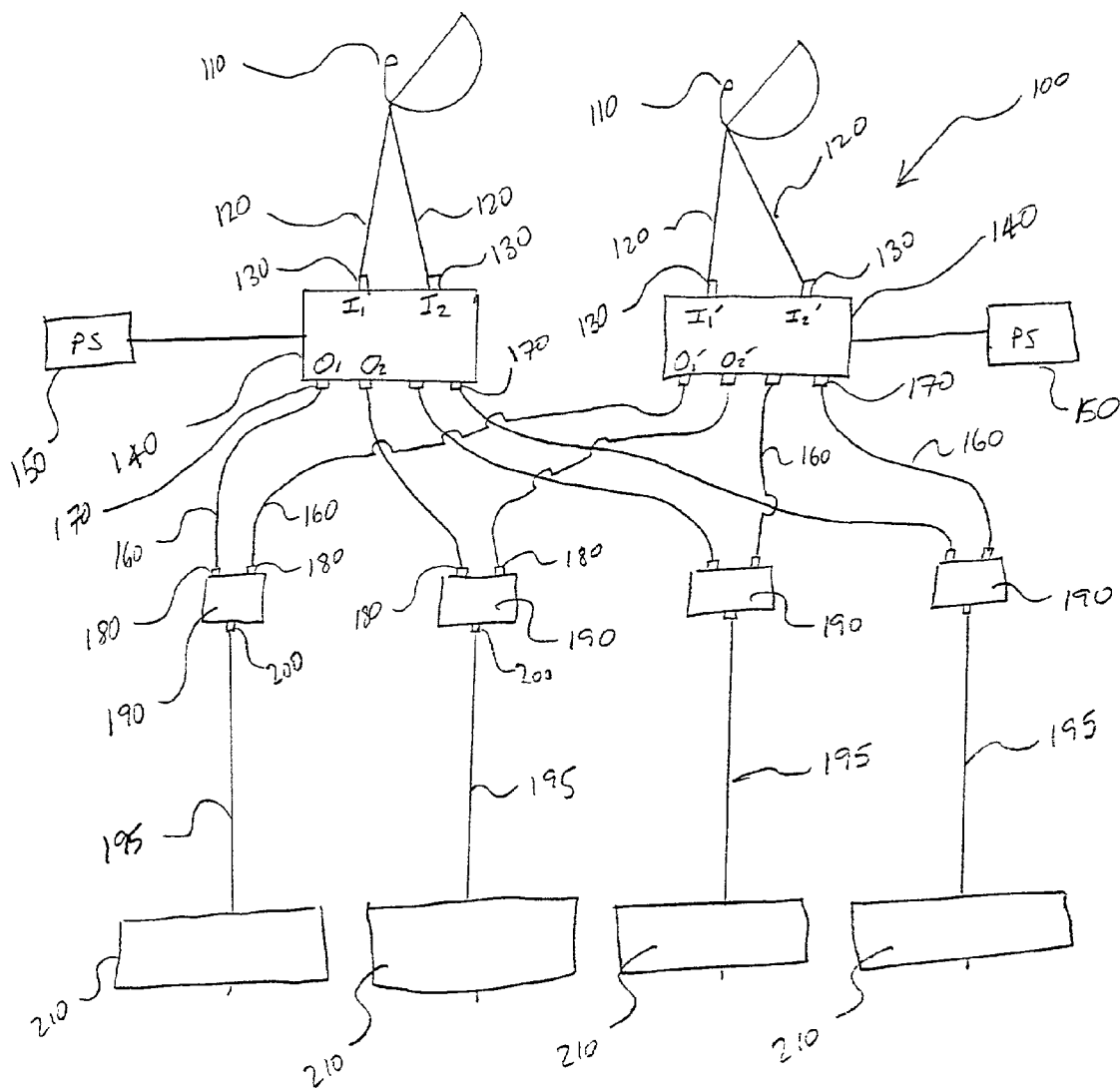
FIG. 1A is a schematic component diagram of a first embodiment of the present invention.
Figure 1B:
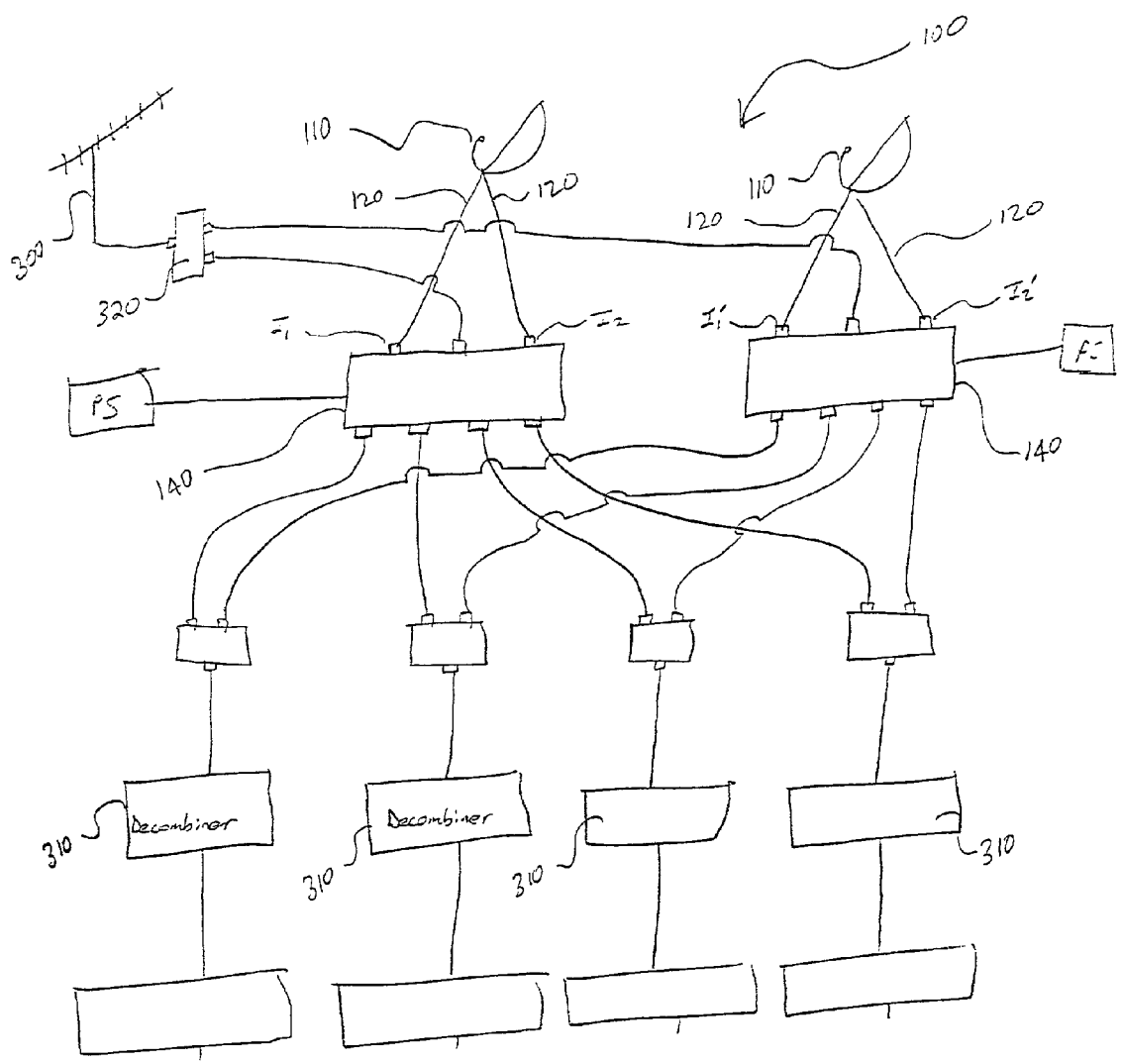
FIG. 1B is a schematic component diagram of a second embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

A system 100 for providing signals from a plurality of satellites to a plurality of receiving units is disclosed. First and second receptors 110 are provided for receiving first and second satellite signals, respectively. The receptors 110 are preferably Low Noise Block components (LNBs) which are placed at or near the focal point of a parabolic satellite DISH to optimize reception of a satellite signal, however, it is contemplated that any suitable receptor component capable of receiving a satellite signal could be utilized. Furthermore, it is contemplated that two separate LNB components could be replaced by a dual LNB component, thus eliminating the need for one DISH antenna. Thus, when separate receptors are referred to herein, such terms are defined to encompass a dual LNB component.

First and second signal component lines 120 are provided in order to create conductive paths from the first and second satellite signals to input ports 130 of first and second primary multi-switches 140, respectively. By signal component line and conductive path, it is meant any conductive element capable of transmitting a signal, including possible further components being placed within the path. It is contemplated and within the scope of the invention that such lines or conductive paths may include amplifiers, and maybe extended over a portion of a building and tapped before connecting to an input port 130. Furthermore, all terms which reference "lines," as used herein, including but not limited to signal component lines, transmission lines, output lines, and conductive paths, are defined to include within the scope of their definition a wireless path, so long as a signal is transmitted in usable form from a starting point to an ending point. Such a wireless path is contemplated to be implemented via wireless audio/video senders, transmitters, and receivers, or any other suitable components. It is also to be understood that any additional components within the "lines," as defined herein are included within the definition of the above terms, as additional components within a line remains within the contemplated and claimed scope of the present invention.

Preferably, the signal component lines 120 transmit vertical and horizontal components of the signal via coaxial or other suitable cable. Primary multi-switches 140 may be any suitable DBS multi-switch, including but not limited to SW24, SW34, SW28, SW38, SW98, or any other suitable DBS multi-switch. In one preferred embodiment, primary multi-switches 140 are SW24, or optionally SW34 switches.

Primary multi-switches 140 are preferably externally powered by power supplies 150. In a preferred embodiment, a plurality of signal transmission lines 160 extend from output ports 170 to provide a conductive paths such that a first line 160 provides a path from a first output port 170 of a first primary multi-switch 140 to a first input port 180 of a first secondary multi-switch 190, a second signal transmission line 160 provides a conductive path from a second output port 170 of the first primary multi-switch 140 to a first input port 180 of a second secondary multi-switch 190, a third signal transmission line 160 provides a conductive path from a first output port 170 of the second primary multi-switch 140 to a second input port 180 of the first secondary multi-switch 190, and a fourth signal transmission line 160 provides a conductive path from a second output port 170 of the second primary multi-switch 140 to a second input port 180 of the second secondary multi-switch 190.

A first additional line 195 provides a conductive path from an output port 200 of the first secondary multi-switch 190 to a first receiving unit 210, and a second additional line 195 provides a conductive path from an output port 200 of the second secondary multi-switch 190 to a second receiving unit 210.

The primary multi-switches 140 and secondary multi-switches 190 must be selected such that poling cycles and circuitry characteristics of the secondary multi-switches 190 are compatible with the primary multi-switches 140, and wherein the receiving units 210 are enabled to seamlessly alternate between the first and second satellite signals.

Preferably, the pattern of the configuration is extended, as shown in FIG. 1A, such that two satellite signals are distributed to up to four receiving units 210. It is further contemplated that lines 160 and lines 195 are any suitable conductive elements, and include optional inclusion of additional components, such additional components being considered part of the line or conductive path. Receiving units 210 are preferably receivers or decoders for use with a television set or other viewing device.

In another preferred embodiment, a terrestrial antenna receptor 300 provides a signal to an additional input port 130 of each of the primary multi-switches 140. In this embodiment, decombiners 310 for separating the satellite signals from the terrestrial antenna signal is included in output lines 195. A splitter 320 may be used to divide the terrestrial signal into two lines for feeding into the additional input ports 130.

Figure 2A:
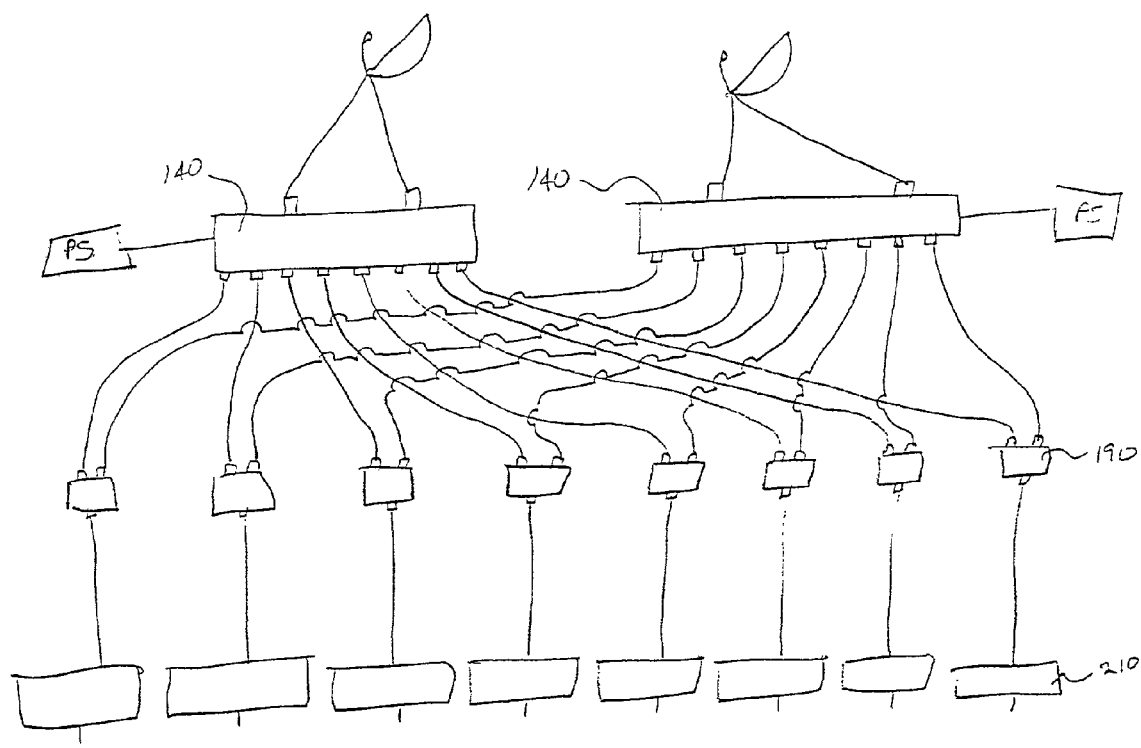
FIG. 2A is a schematic component diagram of a third embodiment of the present invention.
Figure 2B:
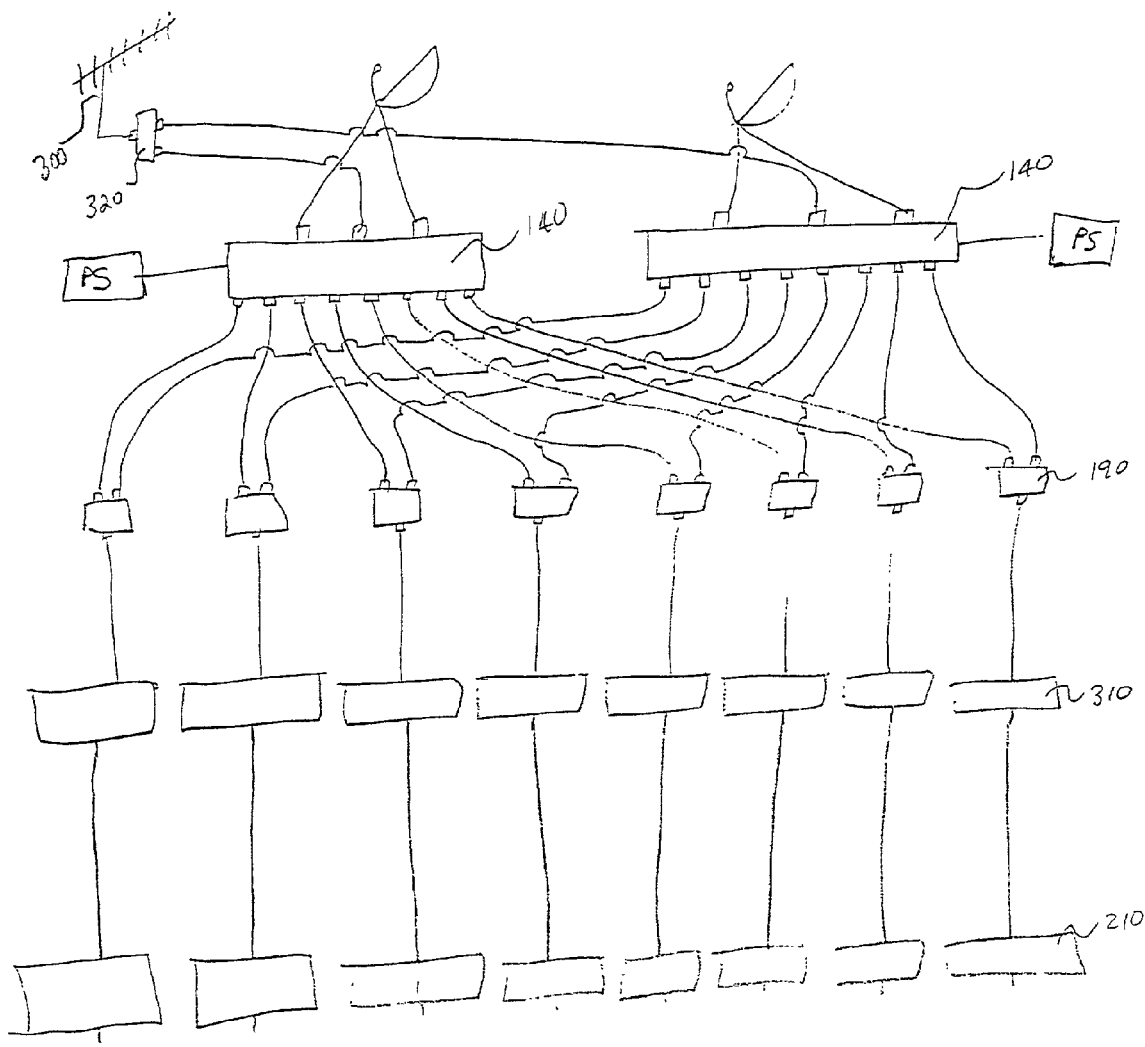
FIG. 2B is a schematic component diagram of a fourth embodiment of the present invention.

In a further preferred embodiment, as illustrated in FIG. 2A, primary multi-switches 140 are SW28 or SW38 switches such that two satellite signals and optionally one terrestrial signal are seamlessly distributed to up to eight receiving units 210.

Figure 3A:
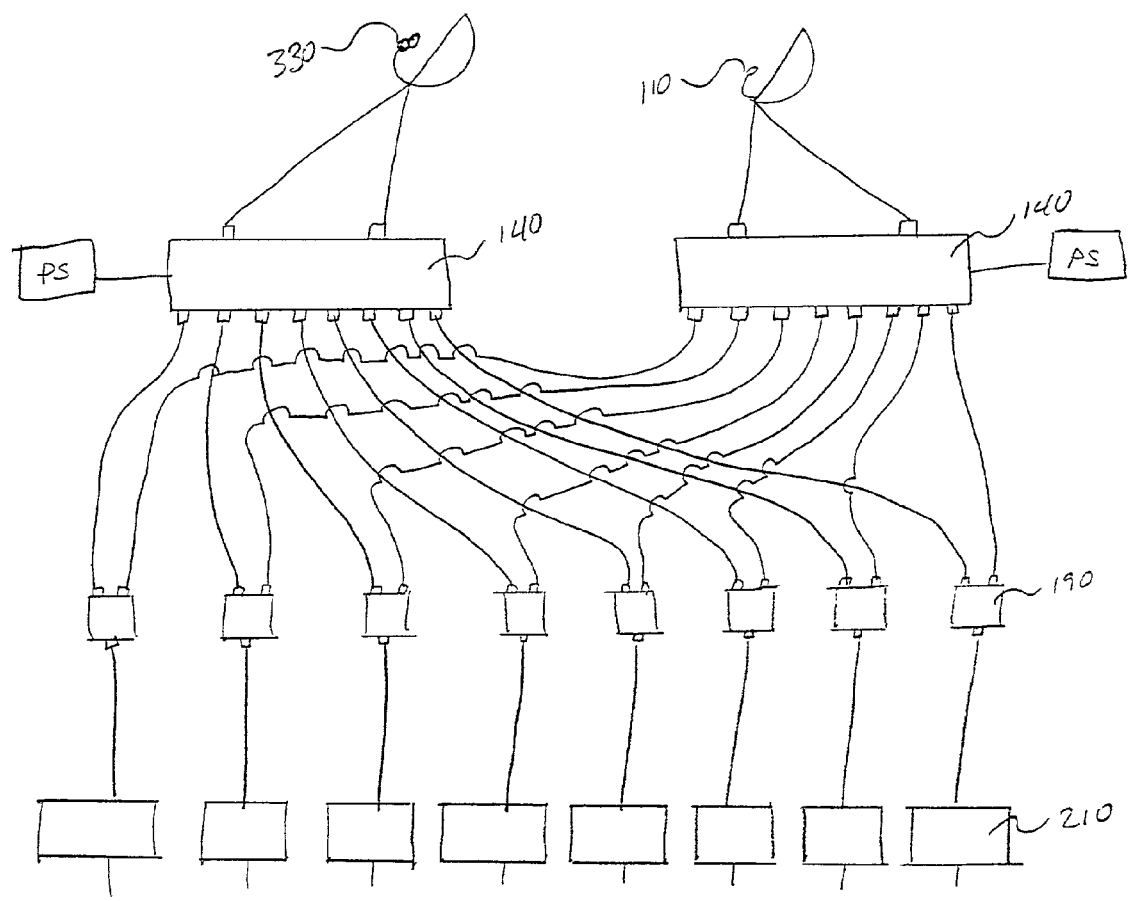
FIG. 3A is a schematic component diagram of a fifth embodiment of the present invention.
Figure 3B:
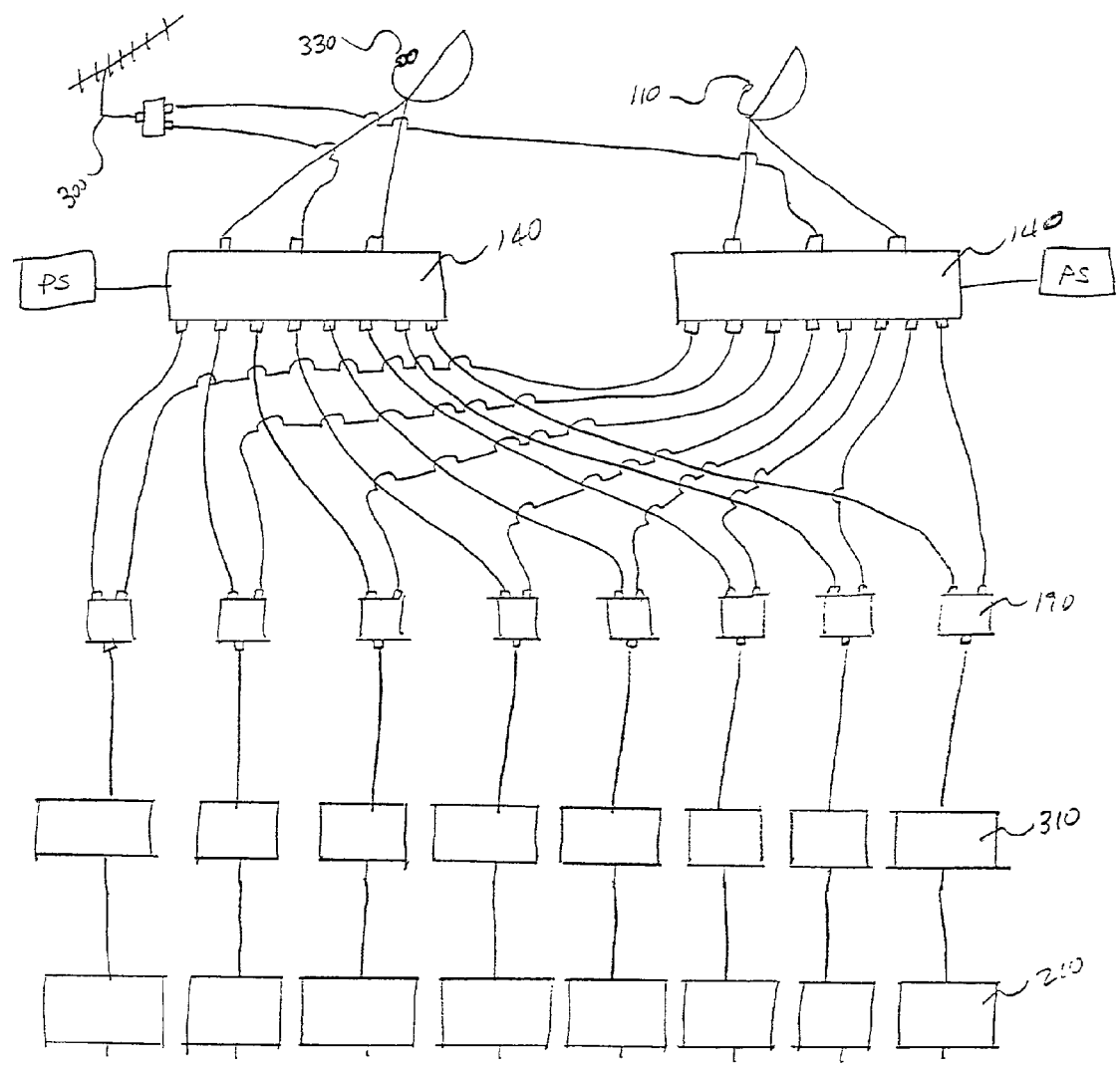
FIG. 3B is a schematic component diagram of a sixth embodiment of the present invention.

In another preferred embodiment of the present invention, as illustrated in FIGS. 3A and 3B, one of the receptors 110 is replaced with a twin receptor unit 330. The twin receptor unit is a component which receives signals from two different satellites, and includes an internal switching mechanism. In such an embodiment, the internal switching mechanism and the primary and secondary multi-switches 140 and 190 must be compatible to allow for seamless switching between signals. In this embodiment, three satellite signals, and optionally one terrestrial signal are seamlessly distributed to up to eight receiving units 210.

In yet a further preferred embodiment of the present invention, a system 100 for providing signals from a plurality of satellites to a plurality of receiving units 210 comprises a first receptor 110 for receiving a first signal from a first satellite, a second receptor 110 for receiving a second signal from a second satellite, a third receptor 110 for receiving a third signal from a third satellite, a first, second, and third primary multi-switch 140 each having a plurality of input ports 130 and a plurality of output ports 170, two signal component lines 120 extending from each of the receptors 110 providing conductive paths to respective input ports 130 of the primary multi-switches 140. Both signal component lines 120 from each of the receptors 110 are connected to the input ports 130 of a respective single primary multi-switch 140. A set of at least two secondary multi-switches 190 each has a plurality of input ports 180 and at least one output port 200. A first transmission line 160 provides a conductive path from a first output port 170 of a first primary multi-switch 140 to a first input port 180 of a first secondary multi-switch 190. A second transmission line 160 provides a conductive path from a second output port 170 of the first primary multi-switch 140 to a first input port 180 of a second secondary multi-switch 190. A third transmission line 160 provides a conductive path from a first output port 170 of a second primary multi-switch 140 to a second input port 180 of the first secondary multi-switch 140. A fourth transmission line provides a conductive path from a first output port 170 of the third primary multi-switch 140 to a second input port 180 of the second secondary multi-switch 190. A first output line 195 provides a conductive path from at least one output port 200 of the first secondary multi-switch 190 to a first receiving unit 210, and a second output line 195 provides a conductive path from at least one output port 200 of the second secondary multi-switch 190 to a second receiving unit 210. Again, the poling cycles and circuitry characteristics of the secondary multi-switches 190 must be compatible with the primary multi-switches. In this embodiment, the first receiving unit 210 is enabled to seamlessly alternate between the first and second satellite signals, and the second receiving unit is enabled to seamlessly alternate between the first and third satellite signals.

Figure 4A:
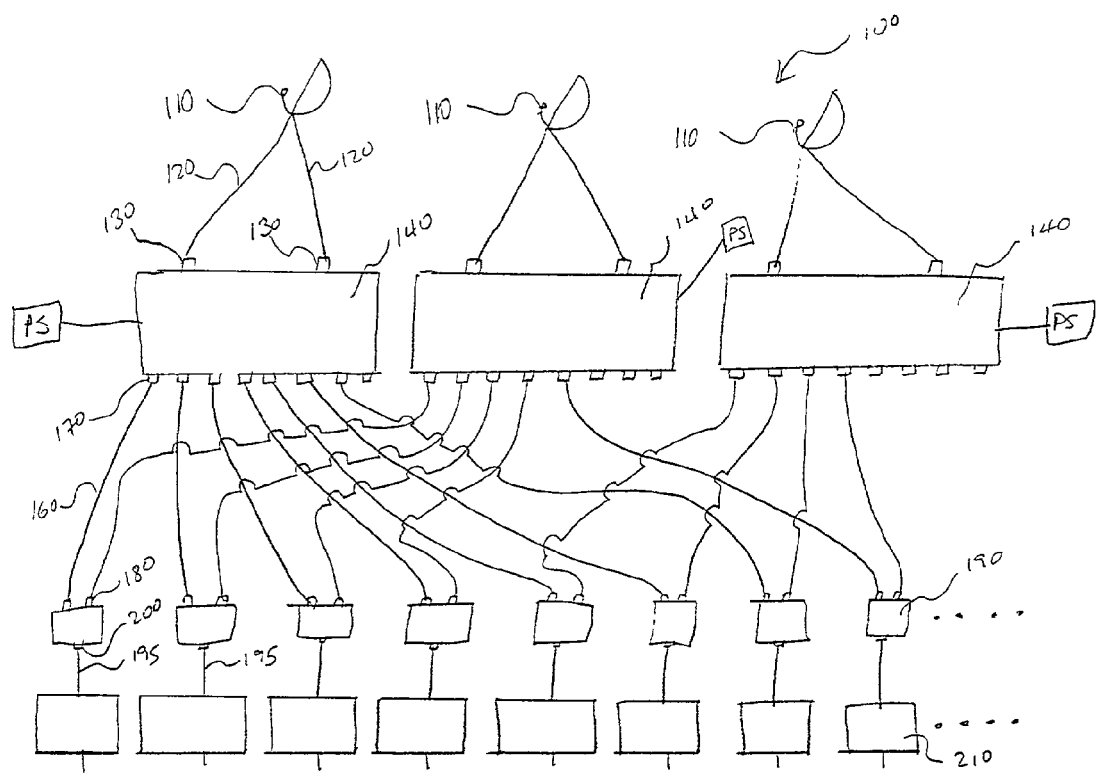
FIG. 4A is a schematic component diagram of a seventh embodiment of the present invention.
Figure 4B:
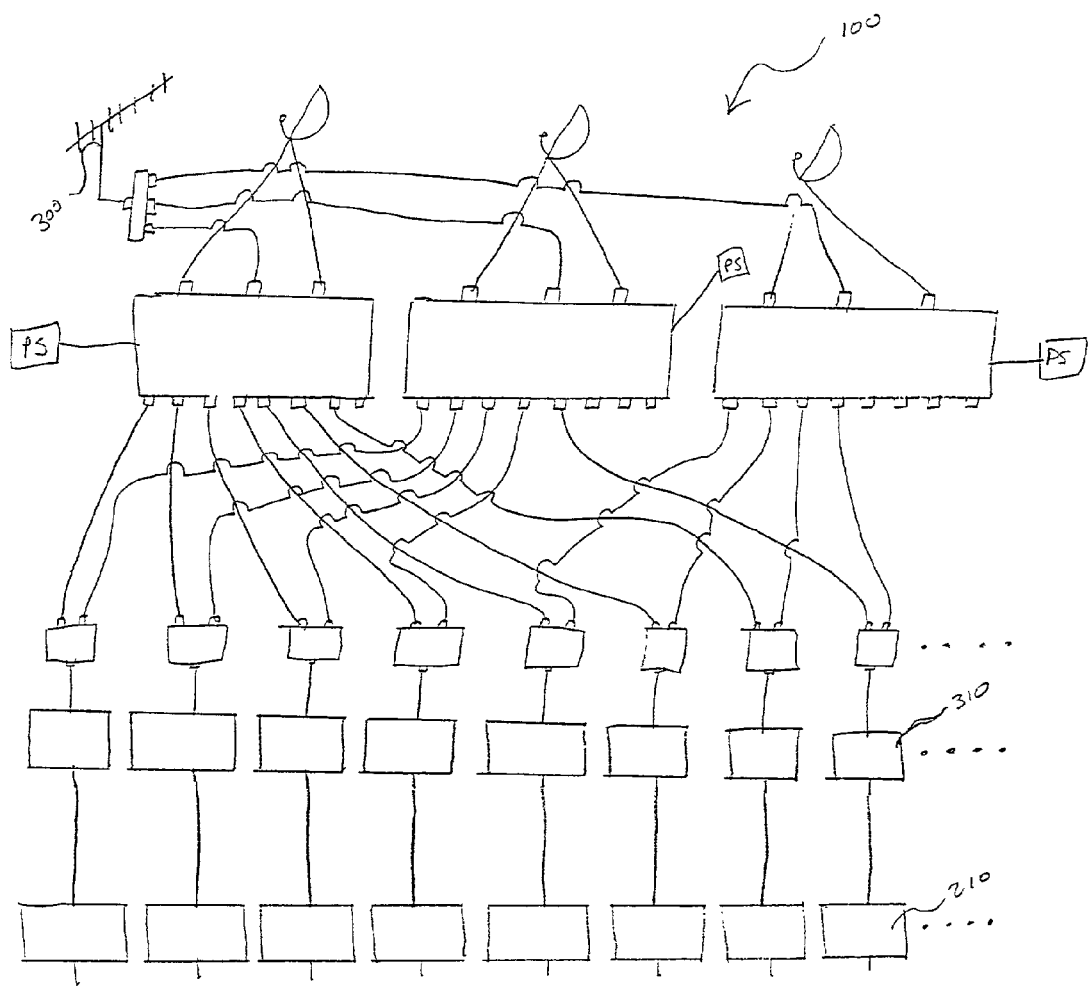
FIG. 4B is a schematic component diagram of a eighth embodiment of the present invention.
Figure 5:
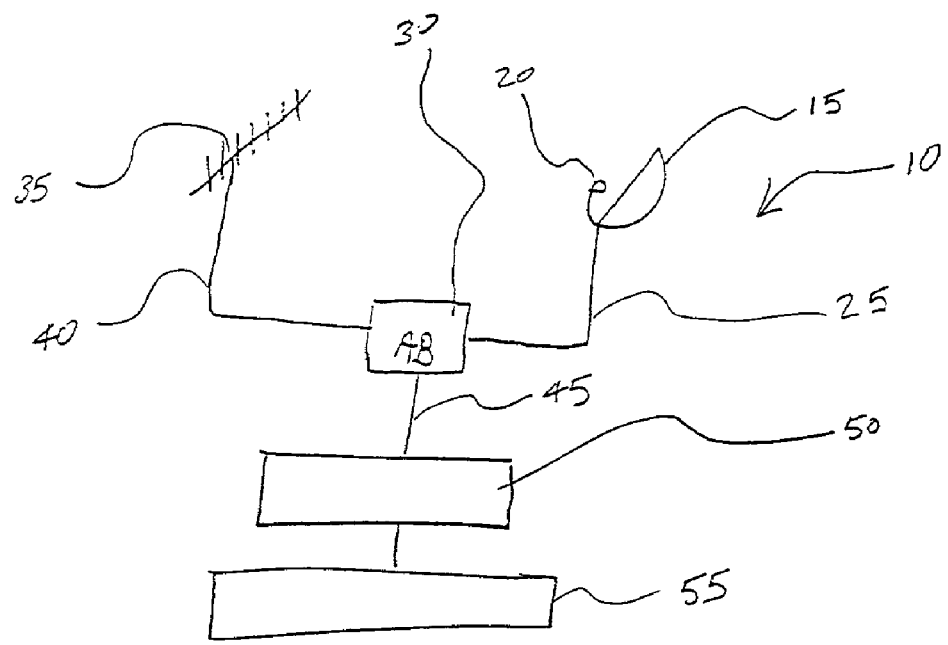
FIG. 5 is a schematic component diagram of a prior art system for providing signals to a receiving unit.
Figure 6:
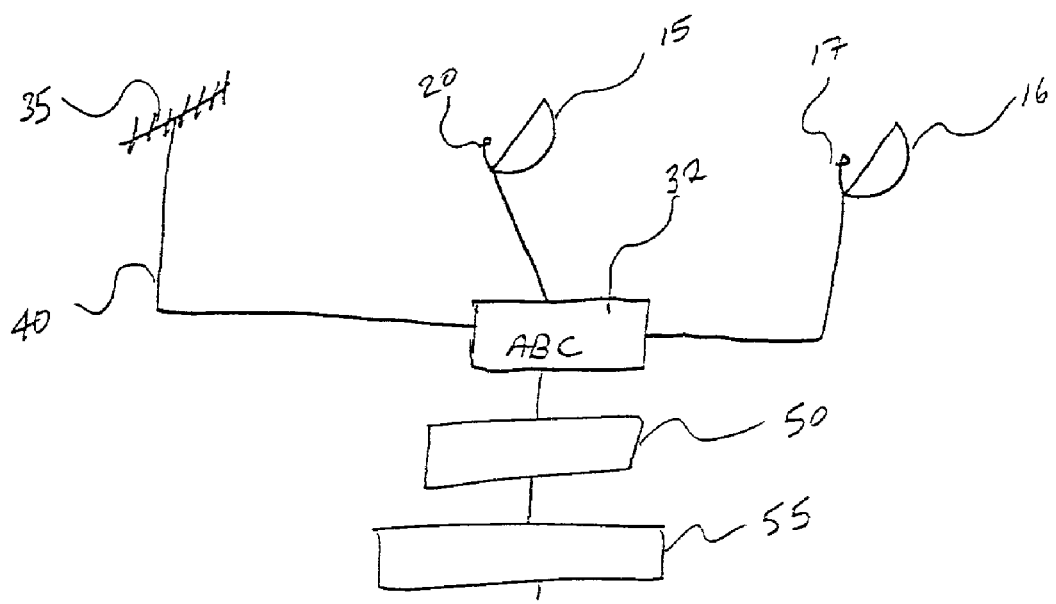
FIG. 6 is a schematic component diagram of another prior art system for providing signals to a receiving unit.
Figure 7:
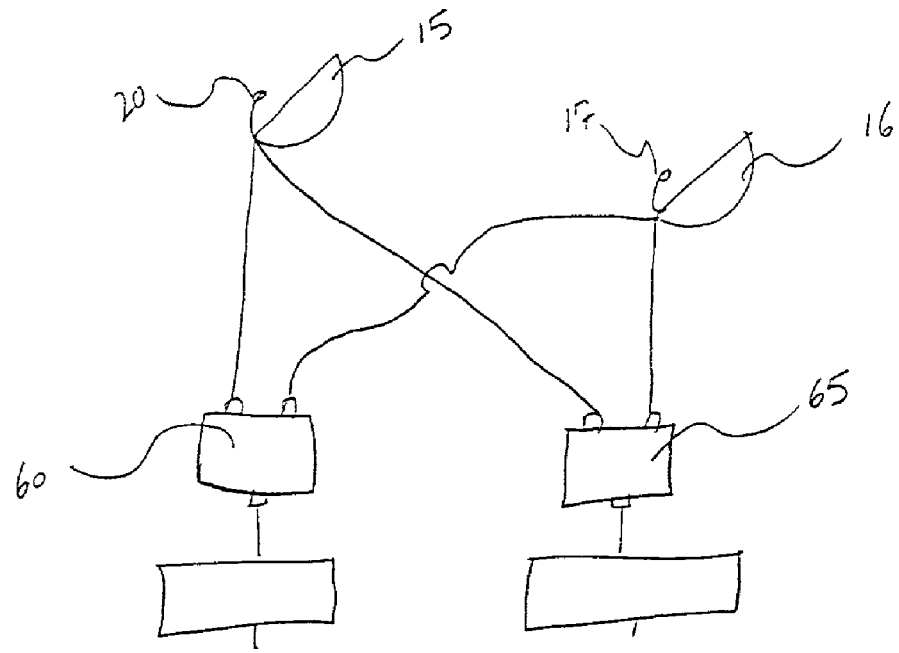
FIG. 7 is a schematic component diagram of yet another prior art system for providing signals to a receiving unit
Figure 8:
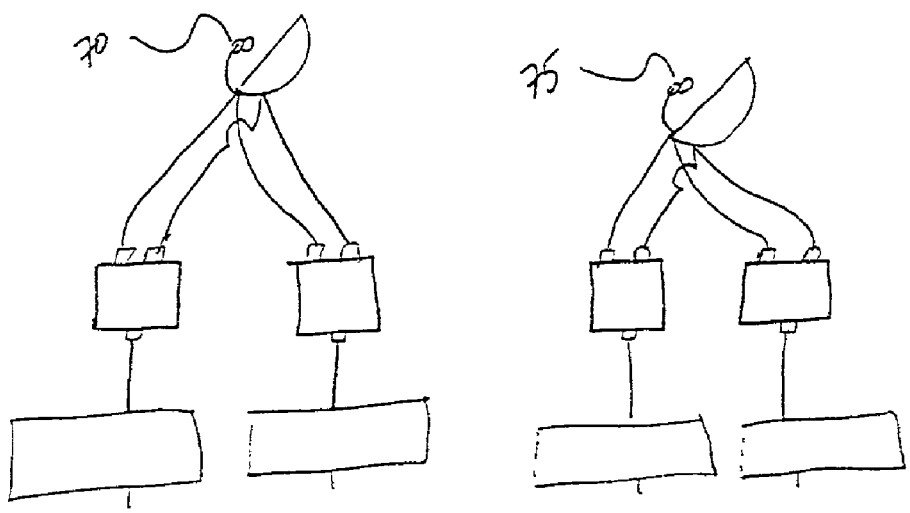
FIG. 8 is a schematic component diagram of a further prior art system for providing signals to a receiving unit.
Figure 9:
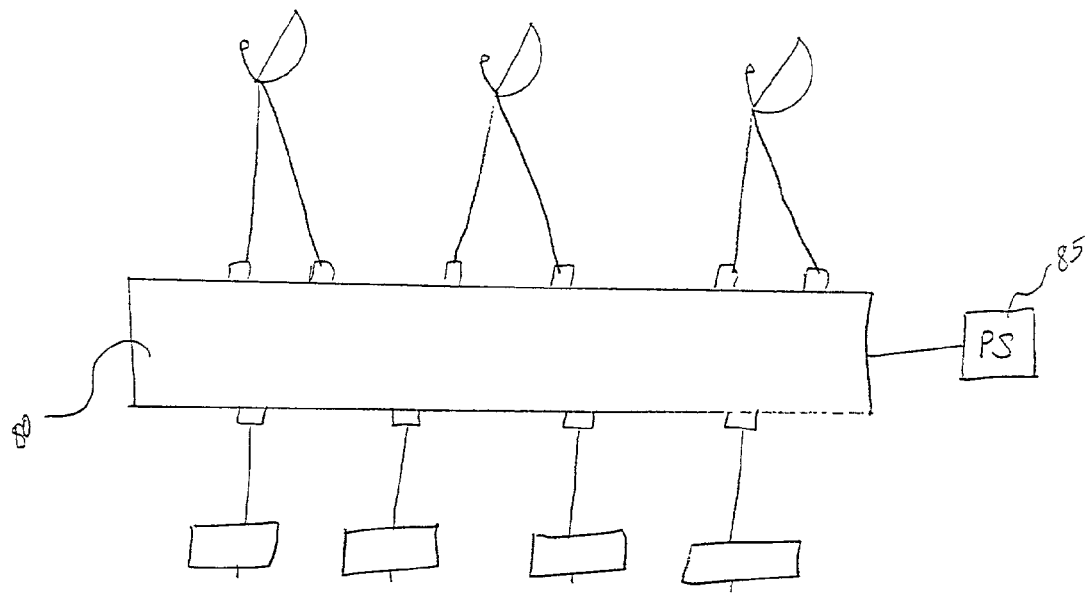
FIG. 9 is a schematic component diagram of a yet a further prior art system for providing signals to a receiving unit.
Figure 10:
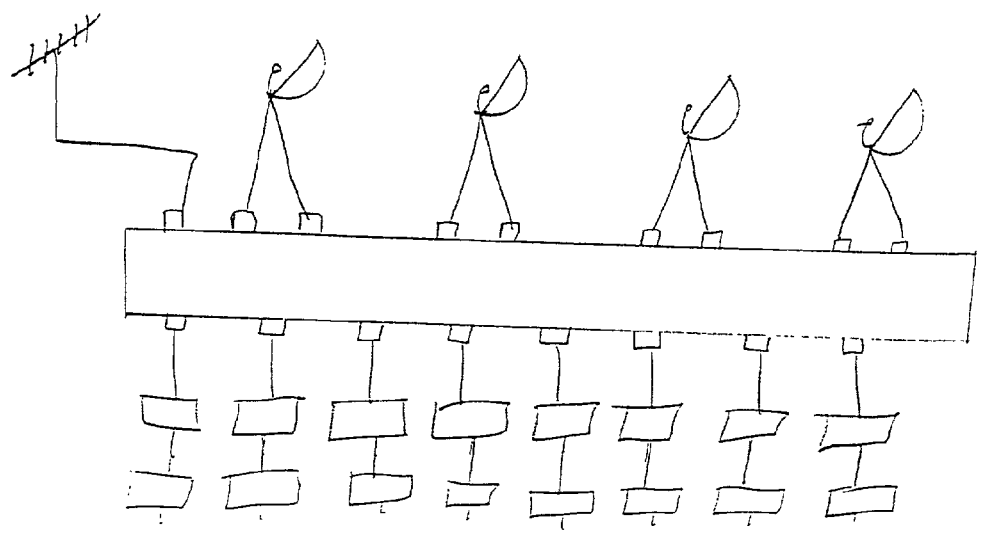
FIG. 10 is a schematic component diagram of still a further prior art system for providing signals to a receiving unit.

Optionally extending this embodiment, a fifth transmission line 160 provides a conductive path from a second output port 170 of the second primary multi-switch 140 to a first input port 180 of a third secondary multi-switch 190, and a sixth transmission line 160 provides a conductive path from a second output port 170 of the third primary multi-switch 140 to a second input port 180 of the third secondary multi-switch 190. A third output line 195 provides a conductive path from at least one output port 200 of the third secondary multi-switch 190 to a third receiving unit 210, wherein the third receiving unit 210 is enabled to seamlessly alternate between the second and third satellite signals. A terrestrial antenna signal can optionally be added to this embodiment, as illustrated in FIG. 4B.

Figure 11:
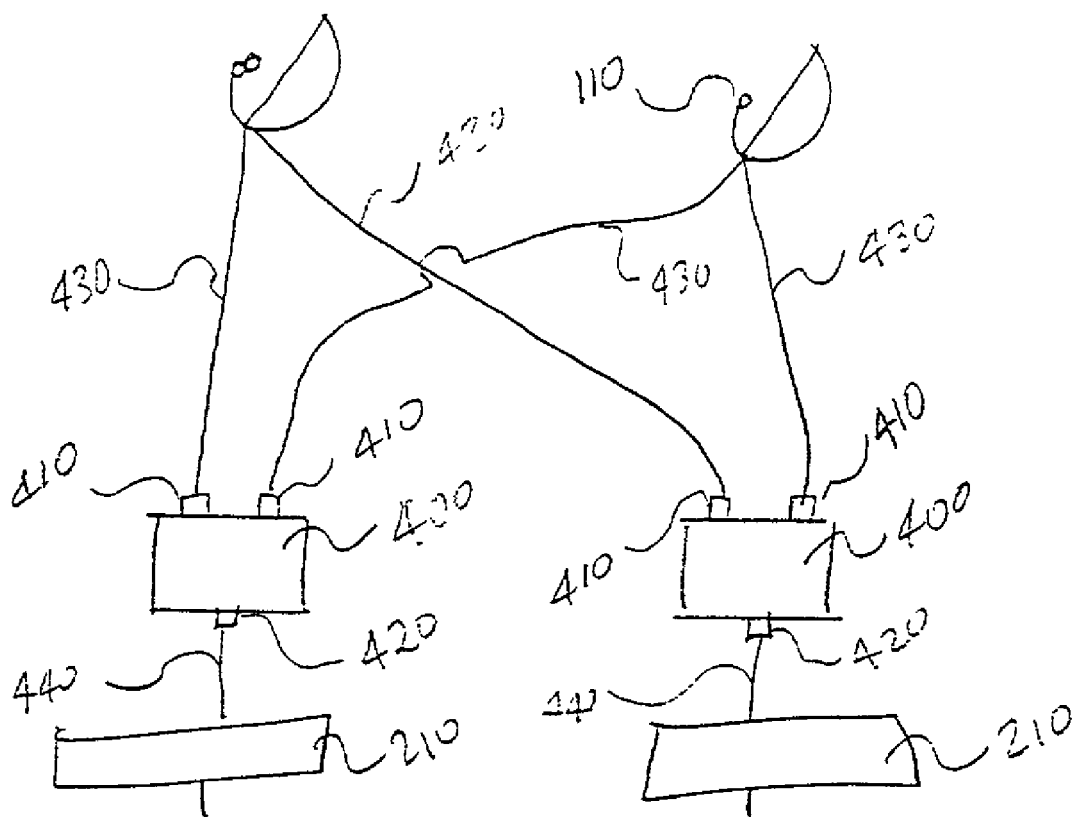
FIG. 11 is a schematic component diagram of a ninth embodiment of the present invention.

Still another embodiment of the present invention, as illustrated in FIG. 11, includes a first receptor 110 for receiving a first signal from a first satellite, a twin receptor unit 330 for receiving a second signal from a second satellite and a third signal from a third satellite wherein the twin receptor unit 330 comprises an internal switching mechanism, a first and a second multi-switch 400 each having a first and second input port 410 and an output port 420, a first signal component line 430 providing a conductive path from the twin receptor unit 330 to the first input port 410 of the first multi-switch 400, a second signal component line 430 providing a conductive path from the twin receptor unit 330 to the first input port 410 of the second multi-switch 400, a third signal component line 430 providing a conductive path from the first receptor 110 to the second input port 410 of the first multi-switch 400, a fourth signal component line 430 providing a conductive path from the first receptor 110 to the second input port 410 of the second multi-switch 400, and output lines 440 providing conductive paths from each of the output ports 420 to receiving units 210, wherein poling cycles and circuitry characteristics of the multi-switches 400, and the internal switching mechanism are compatible, and wherein said receiving units 210 are enabled to seamlessly alternate between the first, second, and third satellite signals.

In the method of the present invention, the system, in its various embodiments as described above, is provided. The variations of the system are equally applicable to the method for providing signals from a plurality of satellites to a plurality of receiving units of the present invention.

As such, a method for providing signals from a plurality of satellites to a plurality of receiving units is disclosed comprising the steps of providing a first receptor for receiving a first signal from a first satellite, providing a second receptor for receiving a second signal from a second satellite, providing a set of primary multi-switches each having a plurality of input ports and a plurality of output ports, providing two signal component lines extending from each of said receptors to provide conductive paths to respective ones of said input ports of said primary multi-switches, wherein both signal component lines from each of said receptors are connected to the input ports of a respective single one of said primary multi-switches, providing a set of secondary multi-switches each having a plurality of input ports and at least one output port, providing at least two transmission lines which provide conductive paths from at least two of said output ports of a first one of said primary multi-switches each to a first one of said input ports of different ones of said secondary multi-switches, providing at least two additional transmission lines which provide conductive paths from at least two of said output ports of a second one of said primary multi-switches each to a second one of said input ports of said different ones of said secondary multi-switches, and providing output lines from each of said at least one output port of said secondary multi-switches which provide conductive paths to each of a plurality of receiving units, wherein poling cycles and circuitry characteristics of said secondary multi-switches are compatible with said primary multi-switches, and wherein said receiving units are enabled to seamlessly alternate between said first and second satellite signals.

As discussed, the optional elements and further embodiments as described above with respect to the system of the present invention are incorporated into the method of the present invention by providing each of the components or elements as indicated above.

While the specific embodiments have been illustrated and described, numerous modifications come to mind without significantly departing from the spirit of the invention, and the scope of protection is only limited by the scope of the accompanying claims.

What is claimed is:

1. A system for providing signals from a plurality of satellites to a plurality of receiving units comprising:
    first and second receptors for receiving first and second satellite signals, respectively,
    first and second signal component lines providing conductive paths from said first and second satellite signals to input ports of first and second primary multi-switches, respectively,
    a plurality of signal transmission lines wherein a first signal transmission line provides a conductive path from a first output port of said first primary multi-switch to a first input port of a first secondary multi-switch, a second signal transmission line provides a conductive path from a second output port of said first primary multi-switch to a first input port of a second secondary multi-switch, a third signal transmission line provides a conductive path from a first output port of said second primary multi-switch to a second input port of said first secondary multi-switch, and a fourth signal transmission line provides a conductive path from a second output port of said second primary multi-switch to a second input port of said second secondary multi-switch, a first additional line providing a conductive path from an output port of said first secondary multi-switch to a first receiving unit, and a second additional line providing a conductive path from an output port of said second secondary multi-switch to a second receiving unit, wherein poling cycles and circuitry characteristics of said secondary multi-switches are compatible with said primary multi-switches, and wherein said receiving units are enabled to seamlessly alternate between said first and second satellite signals.

2. The system according to claim 1, wherein said first and second primary multi-switches are externally powered.

3. The system according to claim 2, wherein said first primary multi-switch is powered by a first external power supply, and wherein said second primary multi-switch is powered by a second external power supply.

4. A system for providing signals from a plurality of satellites to a plurality of receiving units comprising:

a first receptor for receiving a first signal from a first satellite, a first primary multi-switch having a plurality of input ports comprising at least a first input port $I_1$ and a second input port $I_2$, and a plurality of output ports, a first line extending from said receptor providing a conductive path to input port $I_1$ wherein said first line is adapted to carry a first component of said first signal, a second line extending from said first receptor providing a conductive path to input port $I_2$ wherein said second line is adapted to carry a second component of said first signal, a second receptor for receiving a second signal from a second satellite, a second primary multi-switch having a plurality of input ports comprising at least a first input port $I_1'$ and a second input port $I_2'$, and a plurality of output ports, a third line extending from said second receptor providing a conductive path to input port $I_1'$ wherein said third line is adapted to carry a first component of said second signal, a fourth line extending from said second receptor providing a conductive path to input port $I_2'$ wherein said fourth line is adapted to carry a second component of said second signal, wherein said plurality of output ports of said first primary multi-switch comprises at least a first output port $O_1$ and a second output port $O_2$, and wherein said plurality of output port of said second primary multi-switch comprises at least a first output port $O_1'$ and a second output port $O_2'$, a first signal transmission line providing a conductive path from output port $O_1$ to a first input port of a first secondary multi-switch, a second signal transmission line providing a conductive path from output port $O_2$ to a first input port of a second secondary multi-switch, a third signal transmission line providing a conductive path from output port $O_1'$ to a second input port of said first secondary multi-switch, a fourth signal transmission line providing a conductive path from output port $O_2'$ to a second input port of said second secondary multi-switch, an output port of said first secondary multi-switch being conductively connected to a first receiving unit, and an output port of said second secondary multi-switch being conductively connected to a second receiving unit, and wherein poling cycles and circuitry characteristics of said secondary multi-switches are compatible with said primary multi-switches, and wherein said receiving units are enabled to seamlessly alternate between said first and second satellite signals.

* * * * *